United States Patent
Karnes (10) Patent No.: US 9,971,619 B2
(45) Date of Patent: May 15, 2018

(54) METHODS AND SYSTEMS FOR FORWARDING NETWORK PACKETS WITHIN VIRTUAL MACHINE HOST SYSTEMS

(71) Applicant: Anue Systems, Inc., Austin, TX (US)

(72) Inventor: Joshua D. Karnes, Cedar Park, TX (US)

(73) Assignee: Keysight Technologies Singapore (Holdings) PTE LTD, Singapore (SG)

( * ) Notice: Subject to any disclaimer, the term of this patent is extended or adjusted under 35 U.S.C. 154(b) by 0 days. days.

(21) Appl. No.: 14/515,043

(22) Filed: Oct. 15, 2014

(65) Prior Publication Data

US 2016/0110211 A1   Apr. 21, 2016

(51) Int. Cl.
*G06F 9/455* (2018.01)
*G06F 9/48* (2006.01)
*H04L 12/26* (2006.01)

(52) U.S. Cl.
CPC ...... *G06F 9/45558* (2013.01); *G06F 9/45533* (2013.01); *G06F 9/4843* (2013.01); *H04L 43/12* (2013.01); *G06F 9/4806* (2013.01); *G06F 2009/45591* (2013.01); *G06F 2009/45595* (2013.01); *H04L 43/106* (2013.01)

(58) Field of Classification Search
CPC .............................. G06F 9/455–9/5094; H04L 29/0653–29/06619; H04L 49/00–49/9094
See application file for complete search history.

(56) References Cited

U.S. PATENT DOCUMENTS

| 8,064,485 | B1 | 11/2011 | Montini et al. |
| 8,098,677 | B1 * | 1/2012 | Pleshek ............... H04L 43/12 370/351 |
| 8,767,752 | B1 | 7/2014 | Tripathi et al. |
| 8,789,049 | B2 | 7/2014 | Hutchins et al. |
| 8,861,369 | B2 * | 10/2014 | Reed ............................ 370/241 |

(Continued)

OTHER PUBLICATIONS

Bhatia, Sapan et al., "Trellis: A Platform for Building Flexible, Fast Virtual Networks on Commodity Hardware ," 2008, pp. 1-6.*

(Continued)

*Primary Examiner* — Thuy Dao
*Assistant Examiner* — Christopher J Franco (57) ABSTRACT

Methods and systems for forwarding network packets within virtual machine (VM) host systems are disclosed that provide virtual packet brokers and related virtual test access ports (TAPs) within VM host hardware systems. One or more processing devices are operated to provide a virtual machine (VM) platform, virtual test access port(s) (TAPs), and a virtual packet broker within a virtualization layer. Network packets are then received using the virtual TAPs and copied network packets are sent from the virtual TAPs to the virtual packet broker. The virtual packet broker applies packet content filter(s) to the copied network packets to determine selected packets within the copied network packets to forward to virtual and/or external network packet analysis tool(s). Virtual switches can also be provided within the virtualization layer to forward packets among a plurality of VM platforms and/or external networks.

19 Claims, 6 Drawing Sheets

(56) References Cited

U.S. PATENT DOCUMENTS

| | | | |
|---|---|---|---|
| 8,935,457 B2 | 1/2015 | Feng et al. | |
| 8,972,981 B2* | 3/2015 | Delco | G06F 9/45558 |
| | | | 709/226 |
| 9,008,080 B1* | 4/2015 | Mehta | H04L 49/60 |
| | | | 370/327 |
| 9,037,775 B2 | 5/2015 | Feng et al. | |
| 9,152,552 B2 | 10/2015 | Buswell | |
| 9,166,992 B1* | 10/2015 | Stickle | H04L 63/1408 |
| 9,344,265 B2 | 5/2016 | Karnes | |
| 9,485,191 B2* | 11/2016 | Sindhu | H04L 47/10 |
| 9,548,900 B1 | 1/2017 | Ramasubramanian et al. | |
| 9,647,909 B2* | 5/2017 | Kuan | H04L 43/045 |
| 9,703,589 B2 | 7/2017 | Zheng et al. | |
| 9,825,854 B2 | 11/2017 | Xiao | |
| 2007/0143453 A1 | 6/2007 | Huang | |
| 2009/0073895 A1* | 3/2009 | Morgan | H04L 63/0227 |
| | | | 370/255 |
| 2010/0254499 A1 | 10/2010 | Thavisri | |
| 2010/0329125 A1 | 12/2010 | Roberts et al. | |
| 2011/0299537 A1 | 12/2011 | Saraiya et al. | |
| 2011/0313753 A1 | 12/2011 | Green et al. | |
| 2012/0185914 A1* | 7/2012 | Delco | G06F 9/45558 |
| | | | 726/1 |
| 2012/0230202 A1* | 9/2012 | Reed | H04L 63/0209 |
| | | | 370/241 |
| 2012/0284712 A1* | 11/2012 | Nimmagadda | G06F 9/5077 |
| | | | 718/1 |
| 2012/0317553 A1 | 12/2012 | Santos et al. | |
| 2012/0317566 A1 | 12/2012 | Santos et al. | |
| 2013/0031294 A1 | 1/2013 | Feng et al. | |
| 2013/0064095 A1 | 3/2013 | Chew et al. | |
| 2013/0070762 A1 | 3/2013 | Adams et al. | |
| 2013/0086236 A1 | 4/2013 | Baucke et al. | |
| 2013/0125120 A1* | 5/2013 | Zhang | G06F 9/45558 |
| | | | 718/1 |
| 2013/0148503 A1 | 6/2013 | Hutchison et al. | |
| 2013/0215889 A1 | 8/2013 | Zheng et al. | |
| 2013/0301425 A1 | 11/2013 | Udutha et al. | |
| 2014/0181818 A1 | 6/2014 | Vincent et al. | |
| 2014/0192804 A1 | 7/2014 | Ghanwani et al. | |
| 2014/0215463 A1 | 7/2014 | Hendel et al. | |
| 2014/0226661 A1 | 8/2014 | Mikkattuparamban et al. | |
| 2015/0009809 A1 | 1/2015 | Zhang | |
| 2015/0029853 A1 | 1/2015 | Raindel et al. | |
| 2015/0043581 A1 | 2/2015 | Devireddy et al. | |
| 2015/0074661 A1 | 3/2015 | Kothari et al. | |
| 2015/0100670 A1* | 4/2015 | Anantharam | H04L 45/44 |
| | | | 709/220 |
| 2015/0146527 A1 | 5/2015 | Kishore et al. | |
| 2015/0244617 A1* | 8/2015 | Nakil | H04L 45/70 |
| | | | 709/224 |
| 2015/0250001 A1 | 9/2015 | Tan et al. | |
| 2015/0281120 A1* | 10/2015 | Sindhu | H04L 47/10 |
| | | | 709/226 |
| 2016/0026490 A1* | 1/2016 | Johnsson | G06F 9/45558 |
| | | | 718/1 |
| 2016/0087859 A1* | 3/2016 | Kuan | H04L 43/0817 |
| | | | 715/736 |
| 2016/0087861 A1* | 3/2016 | Kuan | H04L 43/065 |
| | | | 709/224 |
| 2017/0163570 A1 | 6/2017 | Casado et al. | |

OTHER PUBLICATIONS

Nicira, Martin Casado et al., "Virtualizing the Network Forwarding Plane," 2010, pp. 1-6.*
Wang, Yi et al., "Virtual Routers on the Move: Live Router Migration as a Network-Management Primitive," 2008, pp. 231-242.*
Rizzo, Luigi et al., "VALE, a Switched Ethernet for Virtual Machines," 2012, pp. 61-72.*
Natarajan, Sriram et al., "Encrypted Packet Forwarding in Virtualized Networks," 2011, pp. 213-214.*
Rojas-Cessa, Roberto et al., "Evaluation of Switching Performance of a Virtual Software Router," 2012, pp. 1-5.*
Patent Application, Karnes, "Methods And Systems For Network Packet Impairment Within Virtual Machine Host Systems", U.S. Appl. No. 14/515,098, filed Oct. 15, 2014, 20 pgs.
Patent Application, Karnes, "Network Packet Timing Synchronization For Virtual Machine Host Systems", U.S. Appl. No. 14/514,999, filed Oct. 15, 2014, 44 pgs.
Office Action dated Dec. 18, 2015, Karnes, "Methods And Systems For Network Packet Impairment Within Virtual Machine Host Systems", U.S. Appl. No. 14/515,098, filed Oct. 15, 2014, 27 pgs.
Notice of Allowance dated Feb. 10, 2016, Karnes, "Network Packet Timing Synchronization For Virtual Machine Host Systems", U.S. Appl. No. 14/514,999, filed Oct. 15, 2014, 9 pgs.
Response to Office Action filed Apr. 18, 2016, Karnes, "Methods And Systems For Network Packet Impairment Within Virtual Machine Host Systems", U.S. Appl. No. 14/515,098, filed Oct. 15, 2014, 8 pgs.
Office Action dated Oct. 1, 2015, Karnes, "Network Packet Timing Synchronization for Virtual Machine Host Systems", U.S. Appl. No. 14/514,999, filed Oct. 15, 2014, 10 pgs.
Chauhan et al., "Is Doing Clock Synchronization In A VM A Good Idea?", 8 pgs. (2011).
Hirschmann, White Paper, "Precision Clock Synchronization", The Standard IEEE 1588, 20 pgs. (Jul. 2009).
Ridoux et al., "The Case For Feed-Forward Clock Synchronization", 12j pgs. (Feb. 2012).
Cisco Connected Grid Switches System Management Software Configuration Guide, Chapter 5, "Configuring Precision Time Protocol", 16 pgs. (May 2014).
SearchServerVirtualization.com, "Solutions To Five Most Common Problems With Virtualization", 4 pgs. (May 2014).
Eidson, Agilent Technologies, "IEEE-1599 Standard For A Precision Clock Synchronization Protocol For Networked Measurement And Control Systems", A Tutorial, 94 pgs. (Oct. 10, 2005).
Vmware, White Paper, Virtualization Overview, 11 pgs. (2006).
Cisco, "Data Center Fabric With Nanosecond Accuracy—Use IEEE1588 PTP on Nexus 3000 Switches", 13 pgs. (Jun. 2012).
Albedo Telecom, "Synchronization & Mobile Networks", White paper, 15 pgs. (2013).
Response to Office Action filed Jan. 29, 2016; Karnes, "Network Packet Timing Synchronization For Virtual Machine Host Systems," Filed Oct. 15, 2014, U.S. Appl. No. 14/514,999, 8 pgs.
Response to Final Office Action filed Nov. 17, 2016, Karnes, "Methods And Systems For Network Packet Impairment Within Virtual Machine Host Systems", U.S. Appl. No. 14/515,098, filed Oct. 15, 2014, 8 pgs.
Final Office Action dated Aug. 17, 2016, Karnes, "Methods And Systems For Network Packet Impairment Within Virtual Machine Host Systems", U.S. Appl. No. 14/515,098, filed Oct. 15, 2014, 28 pgs.
Office Action dated Mar. 22, 2017, Karnes, "Methods And Systems For Network Packet Impairment Within Virtual Machine Host Systems", U.S. Appl. No. 14/515,098, filed Oct. 15, 2014, 37 pgs.
ZTI Communications, Impairment Emulator Software for IP Networks (IPv4 & IPv6), Version 6.1, Copyright 2014 (PDF doc properties: created/modified Apr. 24, 2014).
Office Action dated Oct. 18, 2017, for Karnes, "Methods And Systems For Network Packet Impairment Within Virtual Machine Host Systems", U.S. Appl. No. 14/515,098, filed Oct. 15, 2014, 42 pgs.
Response submitted Jun. 19, 2017, for Karnes, "Methods And Systems For Network Packet Impairment Within Virtual Machine Host Systems", U.S. Appl. No. 14/515,098, filed Oct. 15, 2014, 42 pgs.
Response submitted Dec. 18, 2017, for Karnes, "Methods and Systems for Network Packet Impairment Within Virtual Machine Host Systems", U.S. Appl. No. 14/515,098, filed Oct. 15, 2014, 9 pgs.
Notice of Allowance dated Jan. 24, 2018, for Karnes, "Methods and Systems for Network Packet Impairment Within Virtual Machine Host Systems", U.S. Appl. No. 14/515,098, filed Oct. 15, 2014, 19 pgs.

(56) References Cited

OTHER PUBLICATIONS

Sadasivarao et al., "Open Transport Switch-A Software Defined Networking Architecture for Transport Networks", 7 pgs. (2013).
Operative Soft, "Network Simulation—Traffic, Paths, and Impairment", 5 pgs. (2011).
Desai, "Technique for Detection of Malicious Packet Drops in Network", University of Massachusetts Amherst, 19 pgs. (2014).

* cited by examiner

METHODS AND SYSTEMS FOR FORWARDING NETWORK PACKETS WITHIN VIRTUAL MACHINE HOST SYSTEMS

TECHNICAL FIELD OF THE INVENTION

This invention relates to network packet communication systems and, more particularly, to network packets communicated within virtual machine host systems.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network packet analysis tools. Network packet analysis tools include a wide variety of devices that analyze packet traffic, including traffic monitoring devices, packet sniffers, data recorders, voice-over-IP monitors, intrusion detection systems, network security systems, application monitors and/or any other network management or security tool device or system. Packets are often forwarded to these network packet analysis tools using network hubs, test access ports (TAPs), and/or switched port analyzer (SPAN) ports available on network switches. For example, certain network switches produced by Cisco Systems include SPAN ports to which traffic on the switches are mirrored. It is also noted that other packet monitoring or access methods may also be used to acquire copies of network packets being communicated within a network packet communication infrastructure.

Certain network communication systems include virtualized processing environments, such as virtual machine (VM) platforms hosted by one or more processing devices, to provide processing resources to user processing systems. For example, network cloud resources made available to network-connected systems are often virtualized such that processors or processing cores associated with a server processing platform (e.g., server blade) and/or combinations of such server processing platforms are used to provide software processing instances or virtual machine platforms within cloud server processing systems. A virtual machine (VM) platform is an emulation of a particular processing system that is created within software being executed on a VM host hardware system. By creating VM platforms within a VM host hardware system, the processing resources of that VM host hardware system can be more easily shared among network connected systems that desire to use these processing resources.

Figure 1:
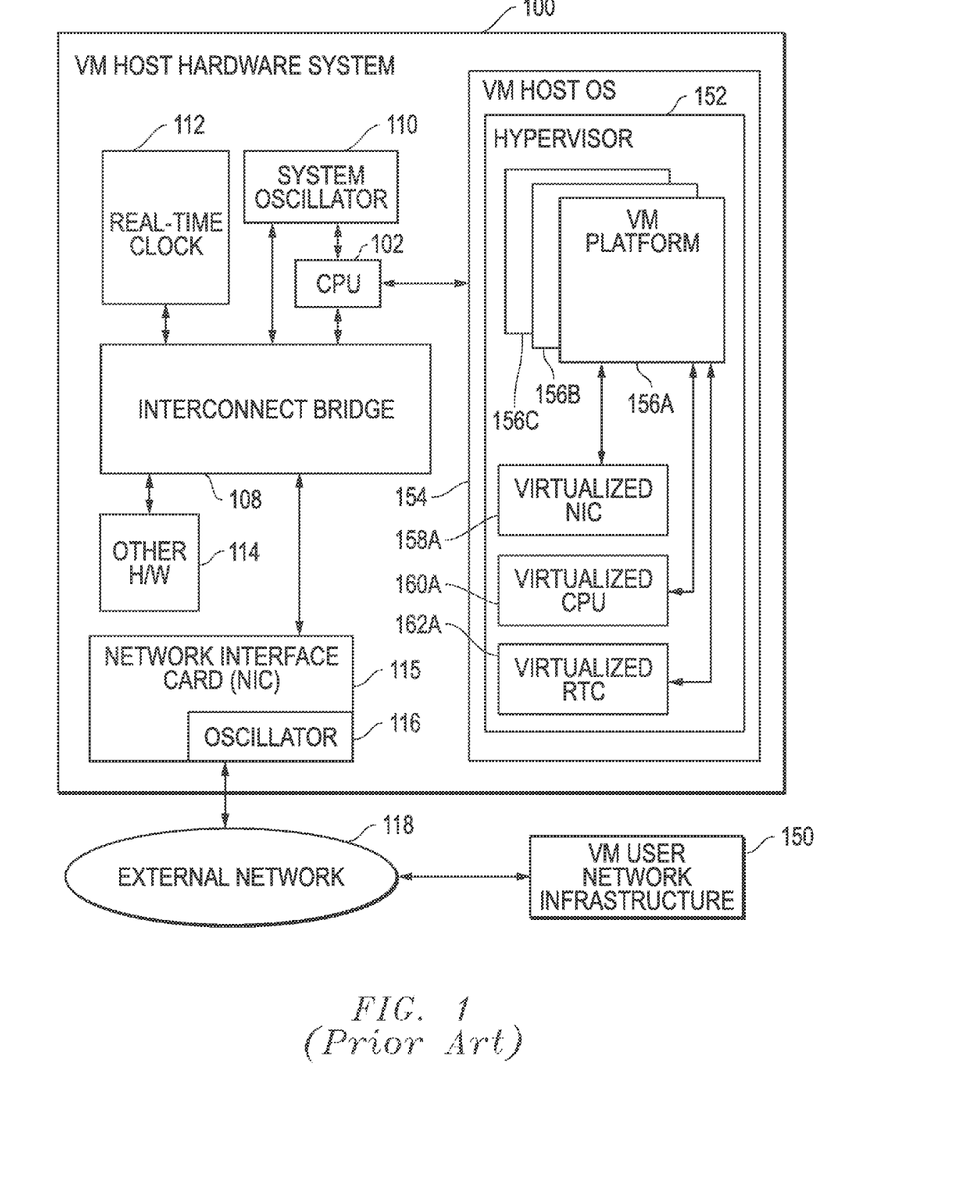
FIG. 1 (Prior Art) is a block diagram of an example embodiment for a virtual machine (VM) host hardware system that communicates with an external network.

FIG. 1 (Prior Art) is a block diagram of an example embodiment for a VM host hardware system 100 that communicates through an external network 118 to network infrastructure 150 for a user of the VM host hardware system 100. For the example embodiment depicted, the VM host hardware system 100 includes a central processing unit (CPU) 102 that runs a VM host operating system 154. An interconnect bridge 108 can also be provided to couple the CPU 102 to additional circuitry and devices within the server system 100. For example, a system oscillator 110, a real-time clock 112, a network interface card (NIC) 115, and other hardware (H/W) 114 can be coupled to the CPU 102 through the interconnect bridge 108. The system oscillator 110 can also have a direct connection to the CPU 102. The NIC 115 can also include an oscillator 116. The real-time clock 112 can be implemented using an integrated circuit including real time clock (RTC) circuitry and non-volatile read only memory (NVRAM) integrated within an integrated circuit (IC).

The VM host hardware system 100 includes a hypervisor 152 that executes on top of the VM host operating system (OS) 154. This hypervisor 152 provides a virtualization layer including a plurality of VM platforms 156A, 156B, 156C . . . that emulate processing systems and related processing resources. As shown with respect to VM platform 156A, each of the VM platforms 156A, 156B, and 156C have one or more virtual hardware resources associated with it, such as a virtualized network interface card (NIC) 158A, a virtualized CPU 160A, a virtualized real-time clock (RTC) 162A, and/or other virtualized hardware resources. The VM host hardware system 100 makes each of the VM platforms 156A-C available for use by one or more network-connected guest systems through the VM host operating system 154 and the hypervisor 152. It is noted that the hypervisor 152 provides a management and control virtualization interface layer between the VM platforms 156A-C and the guest systems using the processing resources provided by the VM platforms 156A-C. It is further noted that the VM host operating system 154, the hypervisor 152, the VM guests 156A-C, and the virtualized hardware resources 158A/160A/162A can be implemented, for example, as computer-readable instructions stored in a non-transitory data storage medium that are accessed and executed by one or more processing devices, such as the CPU 102, to perform the functions for the VM host hardware platform 100.

Figure 2:
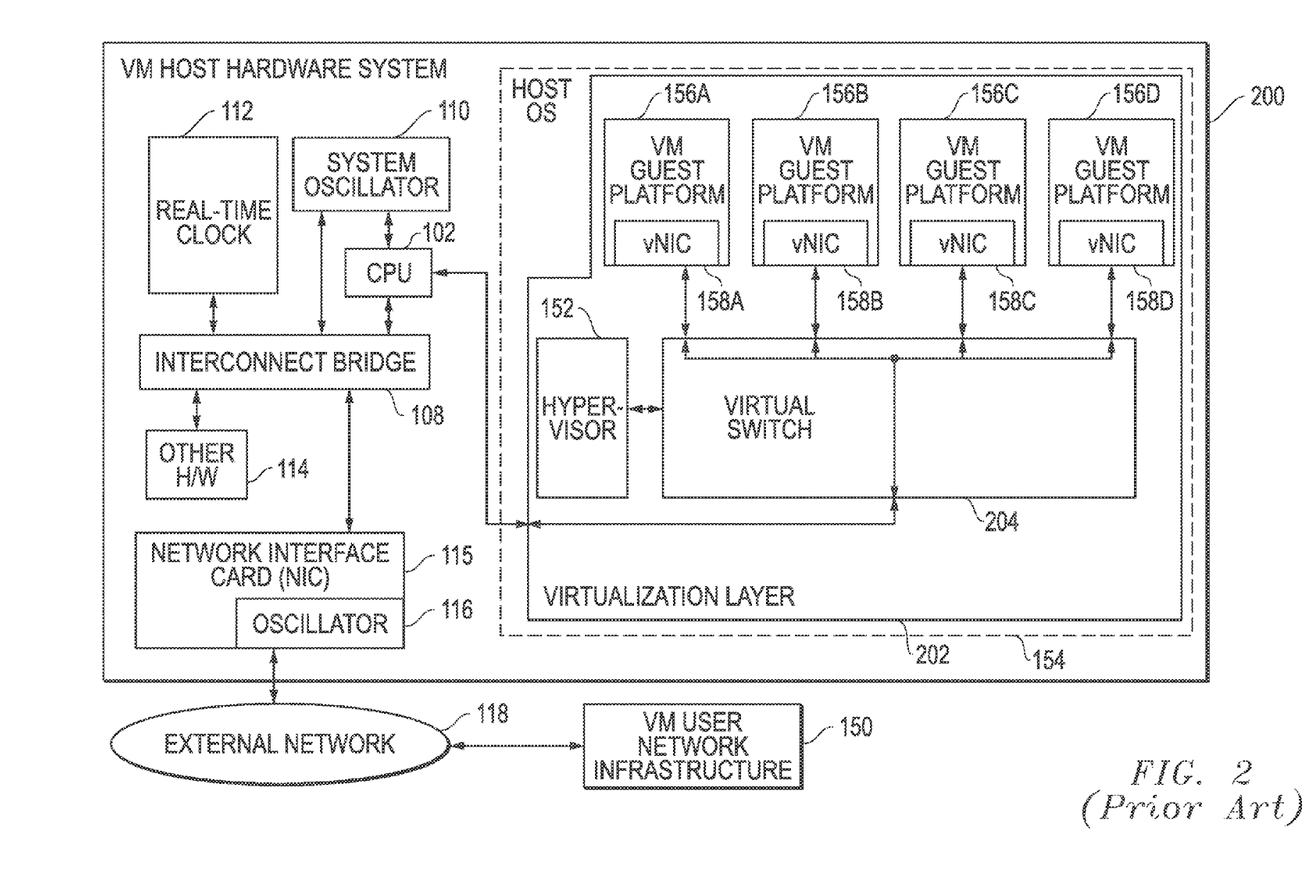
FIG. 2 (Prior Art) is a block diagram of an embodiment where a virtual switch has been included along with the hypervisor within a virtualization layer for a VM host hardware system.

FIG. 2 (Prior Art) is a block diagram of an embodiment 200 where a virtual switch 204 has been included along with the hypervisor 152 within a virtualization layer 202. The virtualization layer 202 can provide one or more virtualized hardware components, such as for example virtualized input/output (IO) interfaces, virtualized network interfaces, virtualized CPUs, virtualized storage mediums, and/or other virtualized components. The virtual switch 204 provides virtual network packet forwarding among the VM platforms 156A, 156B, 156C, and 156D that are hosted as guest processes within the host operating system 154. In particular, the virtual switch 204 communicates with the virtualized NICs 158A, 158B, 158C, and 158D for the VM guest platforms 156A, 156B, 156C, and 156D to forward network packets among the VM guest platforms 156A, 156B, 156C, and 156D and between the VM guest platforms 156A, 156B, 156C, and 156D and the external network 118.

When a VM user network infrastructure 150 desires to monitor activity within a virtual environment such as provided by the embodiments in FIGS. 1-2 (Prior Art), difficulties arise in utilizing network packet analysis tools. One such example environment is where virtual processing resources within a cloud-based server system are offered by a controlling entity (e.g., Amazon Web Services) to different user entities that lease, rent, or otherwise pay for server cloud resources from the controlling entity. If a user entity desires to monitor its network activity, the user typically implements packet monitoring within its own local network infrastructure 150 prior to packets being forwarded to the cloud-based server systems or after packets have been received from the cloud-based server systems as the user does not have access to or control the cloud-based network infrastructure. As such, monitoring packet activity within a user's rented or leased resources within a cloud-based server system is difficult to achieve.

SUMMARY OF THE INVENTION

Methods and systems for forwarding network packets within virtual machine (VM) host systems are disclosed that provide virtual packet brokers and related virtual test access ports (TAPs) within VM host hardware systems. One or more processing devices within the virtual machine (VM) host system are operated to provide at least one virtual machine (VM) platform, at least one virtual test access port (TAP), and a virtual packet broker within a virtualization layer for the VM host system. Network packets associated with packet traffic for the at least one VM platform are then received using the at least one virtual TAP and copied network packets for the received network packets are sent from the at least one virtual TAP to the virtual packet broker. The virtual packet broker then applies one or more packet content filters to the copied network packets to determine selected packets within the copied network packets to forward to one or more network packet analysis tools. These selected packets are then forwarded to the one or more network packet analysis tools. Virtual switches can also be provided within the virtualization layer to forward packets among a plurality of VM platforms and/or external networks. Different features and variations can be implemented, as desired, and related systems and methods can be utilized, as well.

In one embodiment, a method to forward packets within a virtual machine host system is disclosed that includes operating one or more processing devices within a virtual machine (VM) host system to provide at least one virtual machine (VM) platform, at least one virtual test access port (TAP), and a virtual packet broker within a virtualization layer for the VM host system; receiving network packets associated with packet traffic for the at least one VM platform using the at least one virtual TAP; sending copied network packets for the received network packets from the at least one virtual TAP to the virtual packet broker; applying one or more packet content filters within the virtual packet broker to the copied network packets to determine selected packets within the copied network packets to forward to one or more network packet analysis tools; and forwarding the selected packets to the one or more network packet analysis tools.

For other embodiments, the method further includes formatting each selected packet with the virtual packet broker to include at least one target tool identifier identifying a network packet analysis tool to which the selected packet will be forwarded. In additional embodiments, the formatting includes at least one of encapsulating the selected packet with a header that includes the target tool identifier, adding a field to the selected packet that includes the target tool identifier, or including the target tool identifier within an existing field for the selected packet. Further, the selected packets can be forwarded to at least one external network packet analysis tool through an external network for the VM host system. Still further, the method also includes configuring the one or more packet content filters using a configuration interface.

For further embodiments, the one or more processing devices are further operated to provide a plurality of VM platforms within the VM host system. In addition, the one or more processing devices can be operated to provide a plurality of virtual TAPs with at least one virtual TAP being associated with packet traffic for each of the plurality of VM platforms. Further, the one or more processing devices can be operated to provide a virtual network switch configured to forward packets among the plurality of VM platforms within the VM host system.

For still further embodiments, the method also includes adding a timestamp to each copied network packet to indicate when each copied network packet was received by the virtual switch. In addition, the one or more content filters can utilize the timestamps to determine the selected packets to forward to one or more network packet analysis tools. For further embodiments, the selected packets can be forwarded to at least one virtual network packet analysis tool within the virtualization layer, and the virtual network packet analysis tool can perform time-based analysis of the selected packets. Still further, the method can further include sending results from the time-based analysis to an external network coupled to the VM host system. For other embodiments, the selected packets can be forwarded to at least one virtual network packet analysis tool within the virtualization layer.

In one other embodiment, a virtual machine (VM) host system having virtual packet forwarding is disclosed including one or more processing devices configured to provide a virtualization layer comprising at least one virtual machine (VM) platform, at least one virtual test access port (TAP), and a virtual packet broker. The at least one virtual TAP is configured to receive network packets associated with packet traffic for the at least one VM platform and to send copied network packets for the received network packets to the virtual packet broker. And the virtual packet broker is configured to apply one or more packet content filters to the copied network packets to determine selected packets within the copied network packets to forward to one or more network packet analysis tools and to forward the selected packets to the one or more network packet analysis tools.

For other embodiments, the virtual packet broker is further configured to format each selected packet to include at least one target tool identifier identifying a network packet analysis tool to receive the selected packet. Still further, the packet broker can be configured to format each of the selected packets with at least one of an encapsulation header that includes the target tool identifier, an additional field that includes the target tool identifier, or a modification to an existing field to include the target tool identifier. For additional embodiments, the virtual packet broker further includes a configuration interface for the one or more packet content filters.

For further embodiments, the one or more processing devices are further configured to provide a plurality of VM platforms within the VM host system, a virtual network switch configured to forward packets among the plurality of VM platforms, and a plurality of virtual TAPs with at least one virtual TAP being associated with packet traffic for each of the plurality of VM platforms. For additional embodiments, the plurality of virtual TAPs are further configured to add a timestamp to each copied network packet to indicate when each copied network packet was received by the virtual switch. For still further embodiments, the one or more network packet analysis tools includes at least one virtual network packet analysis tool within the virtualization layer, and the virtual network packet analysis tool is configured to perform time-based analysis of the selected packets.

Different and/or additional features, variations, and embodiments can also be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Methods and systems for forwarding network packets within virtual machine (VM) host systems are disclosed that provide virtual packet brokers and related virtual test access ports (TAPs) within VM host hardware systems. One or more processing devices within the virtual machine (VM) host system are operated to provide at least one virtual machine (VM) platform, at least one virtual test access port (TAP), and a virtual packet broker within a virtualization layer for the VM host system. Network packets associated with packet traffic for the at least one VM platform are then received using the at least one virtual TAP and copied network packets for the received network packets are sent from the at least one virtual TAP to the virtual packet broker. The virtual packet broker then applies one or more packet content filters to the copied network packets to determine selected packets within the copied network packets to forward to one or more network packet analysis tools. These selected packets are then forwarded to the one or more network packet analysis tools. Virtual switches can also be provided within the virtualization layer to forward packets among a plurality of VM platforms and/or external networks. Further, Different features and variations can be implemented, as desired, and related systems and methods can be utilized, as well.

As described above, virtual switches for network packets in virtual machine (VM) host hardware systems have been used in virtual environments to emulate real physical layer network packet switches. The embodiments described herein provide mechanisms for virtual packet brokers and related virtual TAPs (test access ports) that allow for forwarding of packet traffic within the virtualization layer to virtual analysis tools and/or to external analysis tools through an external network.

Figure 3:
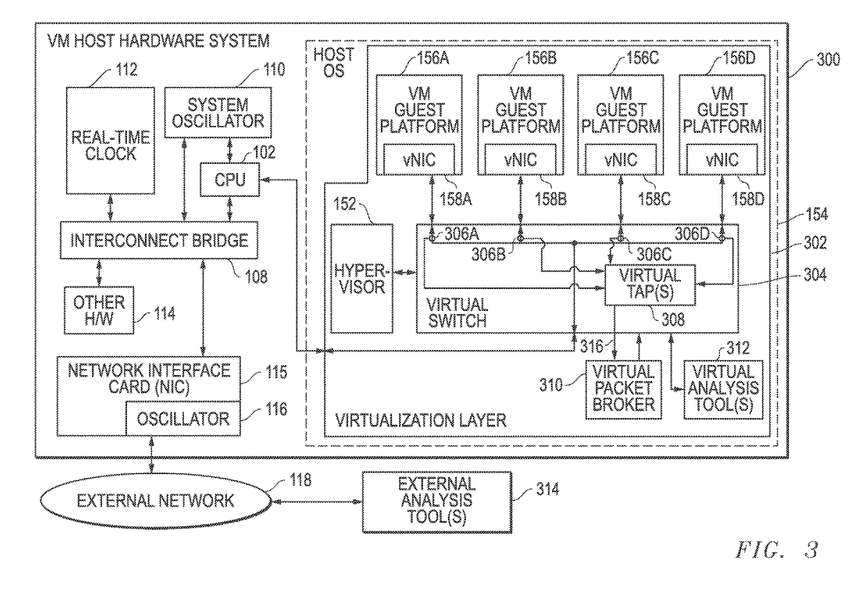
FIG. 3 is a block diagram of an example embodiment for a virtual machine (VM) host hardware system having a virtual packet broker and one or more virtual TAPs (test access ports) that forward selected virtual copied packets to one or more virtual and/or external network packet analysis tools.

FIG. 3 is a block diagram of an example embodiment for a virtual machine (VM) host hardware system 300 having a virtual packet broker 310 and one or more virtual TAPs 308. The virtual TAPs 308 receive packets from one or more virtual tap points 306A-306D within the virtualization layer 302 for the VM host hardware system 300. For the example embodiment depicted, a tap point 306A for a first virtual TAP within the virtual TAPs 308 is associated with packet traffic for a first VM guest platform 156A. A tap point 306B for a second virtual TAP within the virtual TAPs 308 is associated with packet traffic for a second VM guest platform 156B. A tap point 306C for a third virtual TAP within the virtual TAPs 308 is associated with packet traffic for a third VM guest platform 156B. And a tap point 306D for a fourth virtual TAP within the virtual TAPs 308 is associated with packet traffic for a fourth VM guest platform 156D. The virtual TAPs 308 thereby operate to generate virtual copies of the packet traffic at the respective tap points 306A-D, and these virtual copied packets 316 are provided by the virtual packet broker 310. As described further below, the virtual packet broker 310 analyzes the contents of the virtual copied packets 316 and forwards them as one or more packet streams through the virtual switch 304 to one or more virtual packet analysis tools 312 and/or as one or more packet streams through the virtual switch 304 to one or more external analysis tools 314 based upon packet content filters defined within the virtual packet broker 310.

It is noted that the VM host hardware system 300 in part operates in a similar fashion to embodiment 200 of FIG. 2 (Prior Art). The VM host hardware system 300 includes a central processing unit (CPU) 102 that runs a host operating system 154, a system oscillator 110, a real-time clock 112, a network interface card (NIC) 115, and other hardware (H/W) 114 coupled to communicate with the CPU 102 through an interconnect bridge 108. The NIC 115 can also include an oscillator 116, and the system oscillator 110 can also be directly connected to the CPU 102. The real-time clock 112 can be implemented using an integrated circuit including a real time clock (RTC) circuitry and non-volatile read only memory (RTC/NVRAM). The VM host hardware system 400 also includes a hypervisor 152 that executes as part of the virtualization layer 302 on top of the VM host operating system (OS) 154. This hypervisor 152 provides access to a plurality of VM platforms 156A, 156B, 156C, and 156D that emulate processing systems and related processing resources. In part, the VM platforms 156A, 156B, 156C, and 156D have virtualized network interface cards (vNICs) 158A, 158B, 158C, and 158D that are coupled to the virtual switch 304 within the virtualization layer 302.

As described above, one or more additional virtual hardware resources could also be associated with the VM platforms 156A, 156B, 156C, and 156D such as for example virtualized input/output (IO) interfaces, virtualized network interfaces, virtualized CPUs, virtualized storage mediums, and/or other virtualized components. The VM host hardware system 300 makes each of the VM platforms 156A, 156B, 156C, and 156D available for use by one or more network-connected guest systems. It is further noted that the VM host operating system 154, the hypervisor 152, the virtualization layer 302, the virtual switch 304, the virtual TAPs 308 and related tap points 306A-D, the virtual packet analysis tools 312, and the VM guest platforms 206A-D can be implemented, for example, as computer-readable instructions stored in a non-transitory data storage medium that are accessed and executed by one or more processing devices, such as the CPU 102, to perform the functions for the VM host hardware platform 300.

As described above, the virtual switch 304 provides virtual network packet communications among the VM platforms 156A, 156B, 156C, and 156D that are hosted as guest processes within the host operating system 154. In particular, the virtual switch 304 communicates with the virtualized NICs 158A, 158B, 158C, and 158D for the VM guest platforms 156A, 156B, 156C, and 156D to forward network packets among the VM guest platforms 156A, 156B, 156C, and 156D and between the VM guest platforms 156A, 156B, 156C, and 156D and the external network 118. Virtual copies of the virtual packets within the virtual switch 304 are generated by the virtual TAPs 308 at tap points 306A-D and forwarded as virtual copied packets 316 to the virtual packet broker 310. The virtual packet broker 310 analyzes and forwards these virtual copied packets 316 based upon forwarding rules defined within the virtual packet broker 310.

It is again noted that the VM host hardware system 300 can be implemented, for example, using one or more processing devices such as processors and/or configurable logic devices. Processors (e.g., microcontrollers, microprocessors, central processing units, etc.) can be programmed and used to control and implement the functionality described herein, and configurable logic devices such as CPLDs (complex programmable logic devices), FPGAs (field programmable gate arrays), and/or other configurable logic devices can also be programmed to perform desired functionality.

Figure 4:
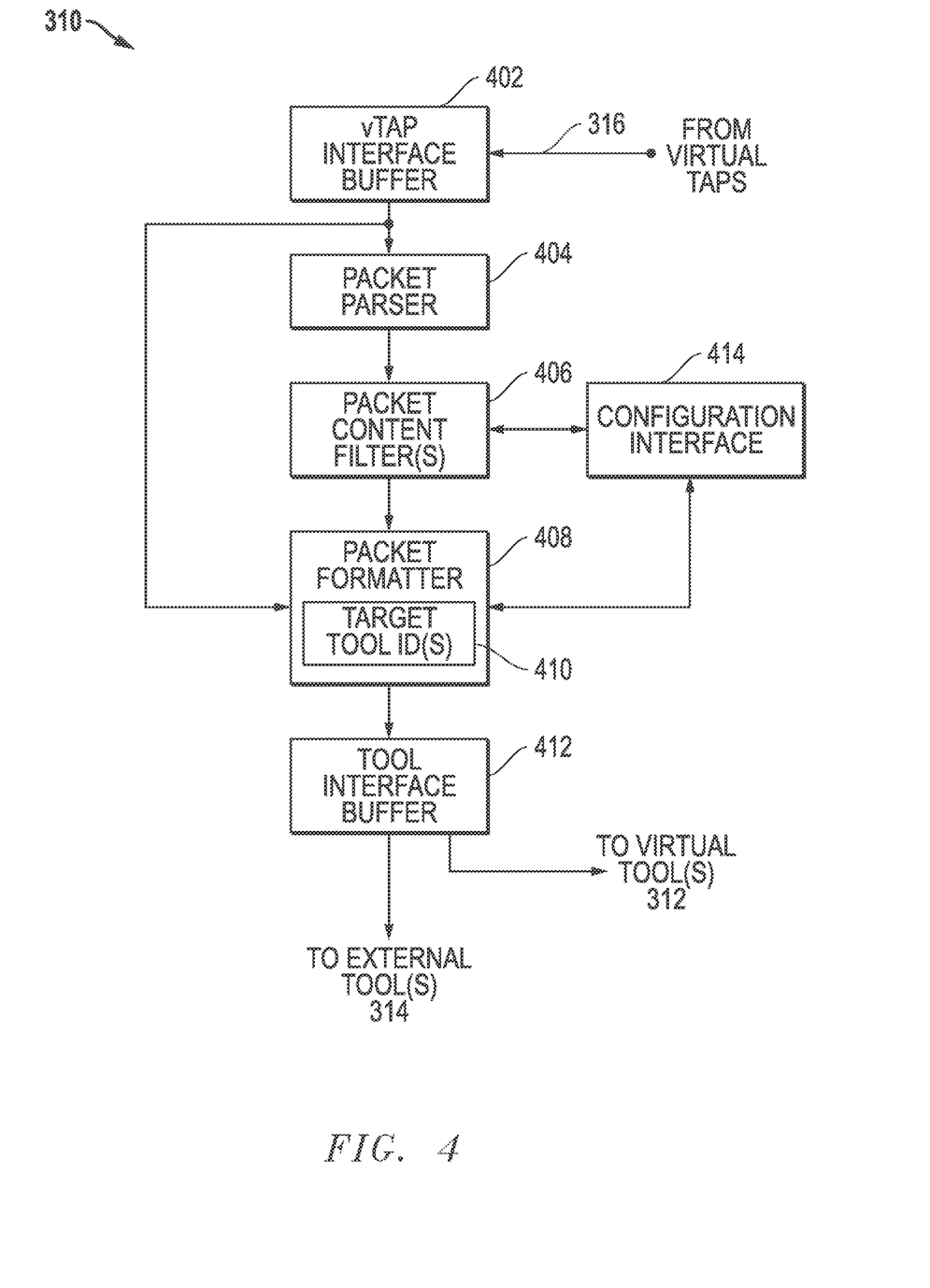
FIG. 4 is a block diagram of an example embodiment for a virtual packet broker.

FIG. 4 is a block diagram of an example embodiment for virtual packet broker 310. The virtual copied packets 316 from the one or more virtual TAPs 310 are received by a virtual TAP (vTAP) interface buffer 402 that can be configured, for example, to store the virtual copied packets 316. A packet parser 404 then analyzes the packets and provides packet contents to one or more packet content filters 406. The packet content filters 406 are defined, for example, using a configuration interface 414. The configuration interface 414 allows for user configuration of the content filters 406 through one or more external interfaces for the VM host hardware system 300. The content filters 406 identify one or more packet analysis tools to receive processed packets based upon the packet contents. The packet formatter 408 receives the results of the packet content filter processing and modifies or reformats the packets to include one or more target identifiers (IDs) 410 for packet analysis tools to receive the packets based upon the content filters 406. As part of this process, the packet formatter 408 can receive a copy of the original virtual copied packet from the vTAP interface buffer 402. The reformatted packets are provided tool interface buffer 412. Based upon the target tool IDs 410 added to the processed packets, the reformatted packets are then forwarded as one or more packet streams through virtual switch 304 to one or more virtual packet analysis tools 312 and/or as one or more packet streams through virtual switch 304 to one or more external packet analysis tools 314.

It is noted that the content filters 406 can rely upon various portions of the content of virtual copied packets 316 for forwarding decisions to the virtual and/or external packet analysis tools 312/314. For example, network packets typically include in part a link layer header (L2), a network layer header (L3), a transport layer header (L4), and a payload, as well as other network layers (e.g., layers within the Open Systems Interconnect (OSI) model for network communications). Information pertinent to forwarding the packet, such as source ID (identifier) and destination ID and protocol type, is usually found in the packet headers. These packets may also have various other fields and information within them, such as fields including error check information, virtual local area network (VLAN) addresses, and/or other information that may be matched and used for filtering. Further, information representing the source device may include items such as the IP address of the source device or the MAC (Media Access Control) address of the source device. It is seen, therefore, that a wide variety of source and destination identifying information may be included within the virtual copied packets, as well as other packet related information along with the data included within the payload of the packet. The packet content filters 406 utilize one or more selected portions of these packet contents to make decisions about which network analysis tools are to receive copies of the virtual copied packets received through the virtual TAPs 308. Based upon the packet content filters 406, the appropriate target tool IDs 410 are added to the processed packets by packet formatter 408.

Figure 5A:
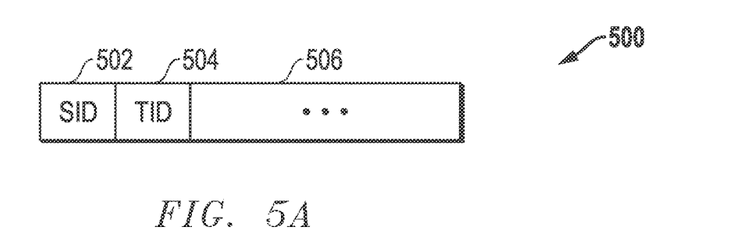
FIGS. 5A-D are diagrams of example embodiments for virtual copied network packets that are processed and output by a virtual packet broker.

FIG. 5A is a diagram of an example embodiment for a network packet 500 that includes a source identifier (SID) 502, a destination or target identifier (TID) 504, and one or more additional fields 506, such as a timestamp, data payload field, and/or other fields. As indicated above, the one or more virtual TAPs 308 can be configured to add or include a timestamp within virtual copied packets to indicate a time at which a virtual TAP receives and makes a copy of the received network packet. The network packet 500 represents one example embodiment for one of the virtual copied packets 316 received by the virtual packet broker 310.

Figure 5B:
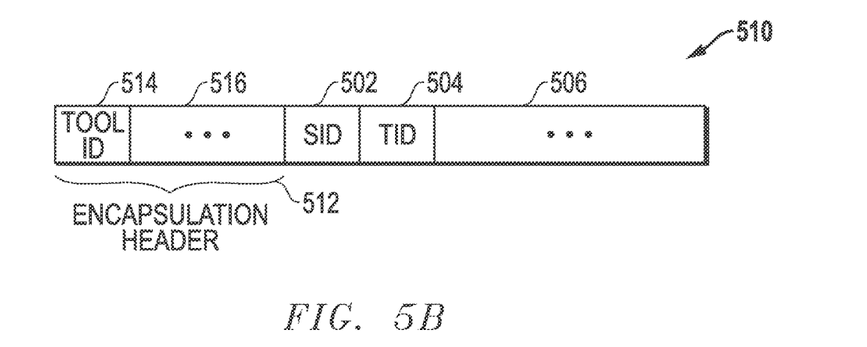

FIG. 5B is a diagram of an example embodiment of a network packet 510 that has been modified by the packet formatter 408 to include an encapsulation header 512. The encapsulation header 512 is added by the packet formatter 408 and includes a tool identifier (Tool ID) field 514 within which a tool ID is inserted by the packet formatter 408. This tool ID is used to forward the processed virtual packet 500 to a virtual or external network analysis tool. The encapsulation header 512 can also include one or more additional fields 516, if desired. Further, it is noted that multiple versions of packet 510 could also be generated by packet formatter 408 if the processed packet 500 is to be forwarded to multiple different virtual or external network analysis tools.

Figure 5C:
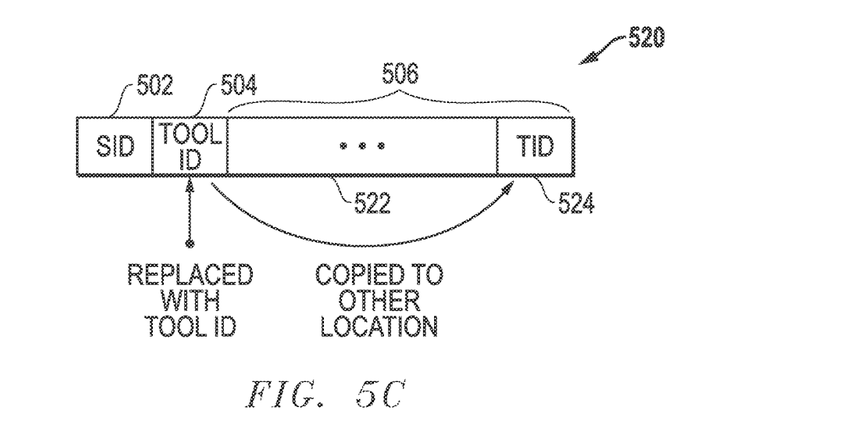

FIG. 5C is a diagram of an example embodiment of a network packet 520 that has been modified by the packet formatter 408 to include an additional field 524. The original target identifier (TID) information can be copied to and stored within this additional field 524. The tool identifier (Tool ID) information can then be inserted into the original field 504 for the processed packet 504 so that it replaces the original target ID information. It is noted that the target ID information could be discarded if not needed. In such an embodiment, the additional field 524 would not be used, and the tool ID would simply replace the original target ID information in field 504. It is again noted that multiple versions of packet 520 could also be generated by packet formatter 408 if the processed packet 500 is to be forwarded to multiple different virtual and/or external network analysis tools.

Figure 5D:
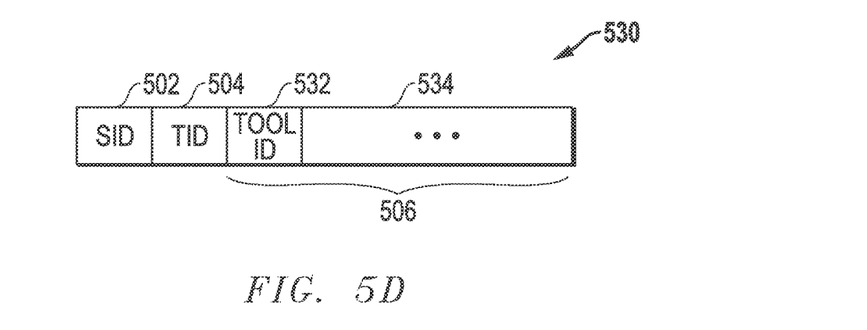

FIG. 5D is a diagram of an example embodiment of a network packet 530 that has been modified by the packet formatter 408 to include the tool ID within a field within the original packet. As depicted, a field 532 within the other fields 506 for the original packet 500 is used to hold the tool ID information. The remaining portion 524 for the other fields 506 within the original packet 500 can still be included within the resulting packet 530. It is again noted that multiple versions of packet 530 could also be generated by packet formatter 408 if the processed packet 500 is to be forwarded to multiple different virtual or external network analysis tools.

It is noted that FIGS. 5B-D provide example embodiments of techniques that can be used by the packet formatter 408 to add target identifiers (IDs) 410 to the processed packet 500. It is further noted that other techniques could also be used, as desired.

Figure 6:
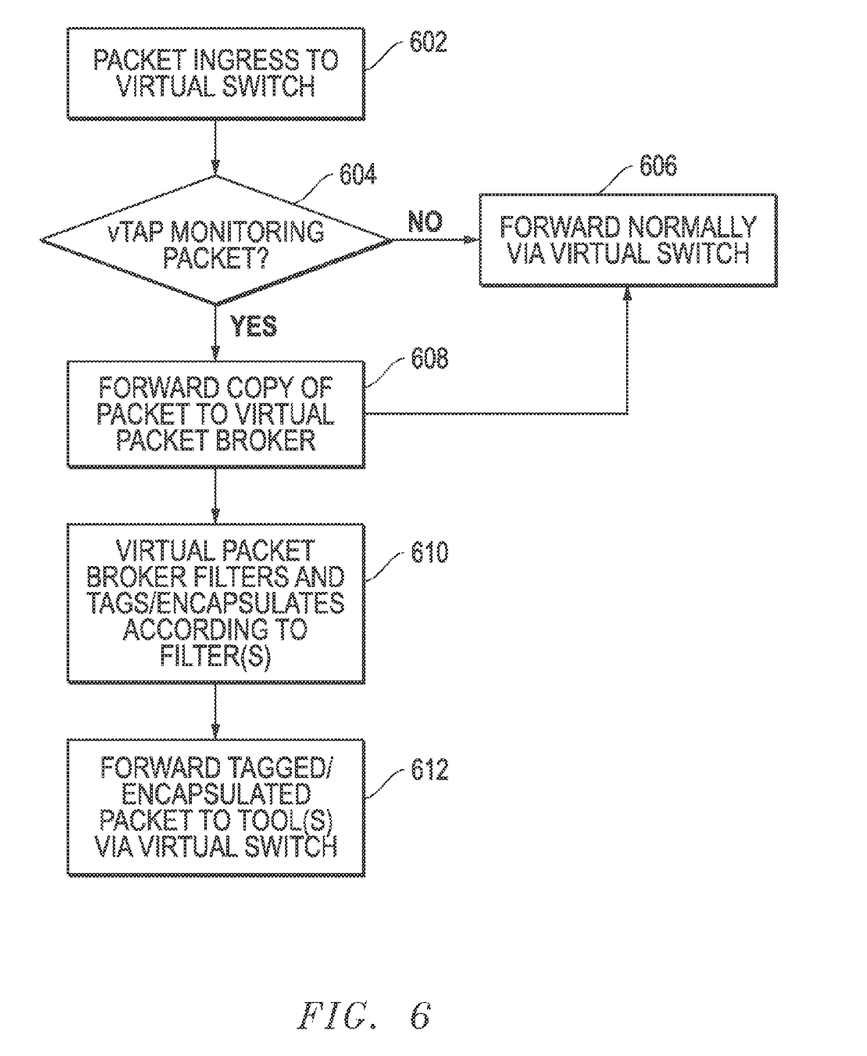
FIG. 6 is a process flow diagram of an embodiment for forwarding packets to one or more virtual and/or external network packet analysis tools using a virtual packet broker and related virtual TAPs.

FIG. 6 provides a process flow diagram of an embodiment 600 for the operation of a virtual packet broker 310 within a virtual switch 304 to analyze copies of virtual packets and to forward them to one or more packet analysis tools 312/314 based upon packet contents. In block 602 an ingress packet is received at the virtual switch 304. In block 604, a determination is made with a virtual TAP (vTAP) is monitoring one or more packet flows for the packet using a virtual tap point, such as tap points 306A-D associated with virtual packet traffic for VM guest platforms 156A-D. If "NO," then flow passes to block 606 where the packet is forwarded normally by the virtual switch 304. If "YES," then flow passes to block 608 where a copy of the packet is forwarded to the virtual packet broker 310. Flow then proceeds to block 606 where the original packet is forwarded normally by the virtual switch 304 based upon its contents. Flow also passes to block 610 where the virtual packet broker 310 filters the copied packet based upon one or more content filters 406. Based upon the results of this filtering, the virtual packet broker 310 tags, encapsulates, or otherwise modifies the virtual copied packet to include a tool identifier (ID) associated with a virtual or external packet analysis tool 312/314 to receive the virtual copied packet. As indicated above, the virtual copied packet can be designated for multiple tools 312/314 depending upon the content filters 406. Next, in block 612, the tagged/encapsulated packet is forwarded to the appropriate tools 312/314 through the virtual switch 304. Other variations and process steps could also be utilized while still taking advantage of the techniques described herein for using a virtual packet broker 310 to identify and direct virtual packets communicate within a virtual switch 304 to one or more network analysis tools 312/314.

It is further noted that the virtual TAPs 308 can be configured to generate timestamps associated with when virtual network packets enters the virtual switch 304 and/or is received by virtual TAPs 308 at a tap point 306A-D. As such, the virtual TAPs 308 can generate timestamps when a virtual packet is received by the virtual switch 304 and can also record a residence time for a virtual packet to travel across the virtual switch 304. The arrival timestamp and/or the residence time can then be added to the virtual copied packet. The virtual packet broker 310 can use this additional timestamp and/or residence time information along with other packets contents to determine which virtual copied packets are to be forwarded to one or more virtual/external packet analysis tools 312/314. For example, the virtual packet broker can be configured to apply a packet content filter that forwards only certain frames within a packet flow (e.g., key frames in video traffic, control packets in telecom traffic) to packet analysis tools. As another example, only selected packets within a packet flow can be forwarded based upon a time-based parameter such as 1 packet within every 1000 packets, 1 packet for every 100 milliseconds of packets, and/or based upon some other time-based parameter. The virtual packet broker 310 then generates new packets and/or adds the timestamp and/or residence time to new packets prior to sending them to a network analysis tool 312/314. It is further noted that the virtual packet broker 310 can also drop or discard data within the packet that is not to be used in further processing. Other variations can also be implemented while still utilizing the virtual packet broker embodiments described herein.

It is also noted that a virtual network packet analysis tool 312 can be configured to collect and analyze timing information relating to the virtual copied packets such as delay, latency, PDV (packet delay variation), and/or other time related information. As the virtual analysis tool 312 is deployed as a VM appliance within the same virtualization layer 302 as the virtual switch 304, the virtual analysis tool 312 alleviates the need to provide actual packet analysis tools within the physical network infrastructure. As such, congestion on physical ports is reduced, thereby improving performance of other packet traffic that is being communicated on physical network infrastructure and/or externally to the external network 118. Advantageously, the timing based analysis is performed within the virtual environment of the VM host hardware system 300 by using a virtual monitoring tool 312 in the VM virtualization layer 302 that also includes the virtual switch 304, the virtual packet broker 306, and the virtual TAPs 308. The results of the analysis of virtual network packet analysis tools 312 can also be sent to external monitoring tools and/or other external systems, as desired, after the analysis has been completed, thereby minimizing the network packet traffic required on the physical network infrastructure.

U.S. patent application Ser. No. 14/514,999, which was concurrently filed on the same date as the present Application and is entitled "NETWORK PACKET TIMING SYNCHRONIZATION FOR VIRTUAL MACHINE HOST SYSTEMS," is hereby incorporated by reference in its entirety. This concurrently filed Patent Application describes example embodiments that provide timing synchronization within VM host hardware systems and that determine residence time for packets traversing a virtual switch within a virtualization layer for a VM host hardware system. The packet broker embodiments described herein can utilize one or more of the embodiments described in this concurrently filed application to provide synchronized timestamps, to determine virtual packet residence time within the virtual switch 304, and/or for other purposes within the embodiments described herein.

It is noted that the operational and functional blocks described herein can be implemented using hardware, software or a combination of hardware and software, as desired. In addition, integrated circuits, discrete circuits or a combination of discrete and integrated circuits can be used, as desired, that are configured to perform the functionality described. Further, configurable logic devices can be used such as CPLDs (complex programmable logic devices), FPGAs (field programmable gate arrays), ASIC (application specific integrated circuit), and/or other configurable logic devices. In addition, one or more processors running software or firmware could also be used, as desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, processors, programmable circuitry (e.g., FPGAs, CPLDs), and/or other processing devices to perform the processes, functions, and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU (central processing unit), controller, microcontroller, processor, microprocessor, FPGA, CPLD, ASIC, or other suitable processing device or combination of such processing devices.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to forward packets within a virtual machine host system, comprising:
    operating one or more processing devices within a virtual machine (VM) host system to provide at least one virtual machine (VM) platform, a virtual network switch, at least one virtual test access port (TAP), and a virtual packet broker within a virtualization layer for the VM host system;
    forwarding packet traffic for the at least one VM platform using the virtual network switch;
    receiving network packets associated with the packet traffic for the at least one VM platform using the at least one virtual TAP;
    generating copies of the network packets using the at least one virtual TAP to form copied network packets;
    adding a residence time to each copied network packet to indicate a time for the copied network packet to travel across the virtual switch;
    sending the copied network packets from the at least one virtual TAP to the virtual packet broker;
    applying one or more packet content filters within the virtual packet broker to the copied network packets to select packets within the copied network packets to forward to a plurality of different network packet analysis tools;
    formatting, with the virtual packet broker, each selected packet to form formatted packets that include a target tool identifier identifying one of the plurality of different network packet analysis tools to which the selected packet will be forwarded;
    sending the formatted packets to the virtual network switch; and
    forwarding, with the virtual network switch, the formatted packets to the plurality of different network packet analysis tools based upon the target tool identifiers included within the formatted packets.

2. The method of claim 1, wherein the formatting for each selected packet includes at least one of encapsulating the selected packet with a header that includes the target tool identifier, adding a field to the selected packet that includes the target tool identifier, or including the target tool identifier within an existing field for the selected packet.

3. The method of claim 1, wherein the one or more processing devices are operated to provide a plurality of VM platforms within the VM host system.

4. The method of claim 3, wherein the one or more processing devices are operated to provide a plurality of virtual TAPs, at least one virtual TAP being associated with packet traffic for each of the plurality of VM platforms.

5. The method of claim 3, wherein the virtual network switch is configured to forward packets among the plurality of VM platforms within the VM host system.

6. The method of claim 5, further comprising adding a timestamp to each copied network packet to indicate when each copied network packet was received by the virtual network switch.

7. The method of claim 6, wherein the one or more content filters utilize the timestamps to determine the selected packets to forward to one or more network packet analysis tools.

8. The method of claim 6, wherein the selected packets are forwarded to at least one virtual network packet analysis tool within the virtualization layer, and wherein the virtual network packet analysis tool performs time-based analysis of the selected packets.

9. The method of claim 8, further comprising sending results from the time-based analysis to an external network coupled to the VM host system.

10. The method of claim 1, wherein selected packets are forwarded to at least one virtual network packet analysis tool within the virtualization layer.

11. The method of claim 1, wherein the selected packets are forwarded to at least one external network packet analysis tool through an external network for the VM host system.

12. The method of claim 1, further comprising configuring the one or more packet content filters using a configuration interface.

13. A virtual machine (VM) host system having virtual packet forwarding, comprising:
    one or more processing devices including at least one of a central processing unit (CPU), a hardware processor, or a hardware configurable logic device, programmed to:
        provide a virtualization layer comprising at least one virtual machine (VM)
            platform, a virtual network switch, at least one virtual test access port (TAP), and a virtual packet broker;
            forward packet traffic for the at least on VM platform using the virtual network switch;
            receive network packets associated with the packet traffic for the at least one VM platform, generate copies of the network packets to form copied network packets, and send the copied network packets to the virtual packet broker using the at least one virtual TAP;
            apply one or more packet content filters to the copied network packets to select packets within the copied network packets to forward to a plurality of different network packet analysis tools, format each selected packet to form formatted packets that include a target tool identifier identifying one of the plurality of different network packet analysis tools to which the selected packet will be forwarded, and send the formatted packets to the virtual network switch; and
            forward the formatted packets, with the virtual network switch, to the plurality of different network packet analysis tools based upon the target tool identifiers included within the formatted packets;
    wherein the one or more processing devices are further configured to add a residence time to each copied network packet to indicate a time for the copied network packet to travel across the virtual switch.

14. The VM host system of claim 13, wherein the one or more processing devices are further programmed to format each of the selected packets with at least one of an encapsulation header that includes the target tool identifier, an additional field that includes the target tool identifier, or a modification to an existing field to include the target tool identifier.

15. The VM host system of claim 13, wherein the one or more processing devices are further programmed to provide a plurality of VM platforms within the VM host system and a plurality of virtual TAPs with at least one virtual TAP being associated with packet traffic for each of the plurality of VM platforms, wherein the virtual network switch is configured to forward packets among the plurality of VM platforms within the VM host system.

16. The VM host system of claim 15, wherein the one or more processing devices are further programmed to add a timestamp to each copied network packet, using the plurality of virtual TAPs, to indicate when each copied network packet was received by the virtual network switch.

17. The VM host system of claim 16, wherein the one or more network packet analysis tools comprises at least one virtual network packet analysis tool within the virtualization layer configured to perform time-based analysis of the selected packets.

18. The VM host system of claim 1, wherein the one or more processing devices are further programmed to provide a configuration interface for the one or more packet content filters.

19. The VM host system of claim 16, wherein the one or more processing devices are further programmed to utilize the timestamps to determine the selected packets to forward to one or more network packet analysis tools.

* * * * *